UNITED STATES PATENT OFFICE 2,326,166

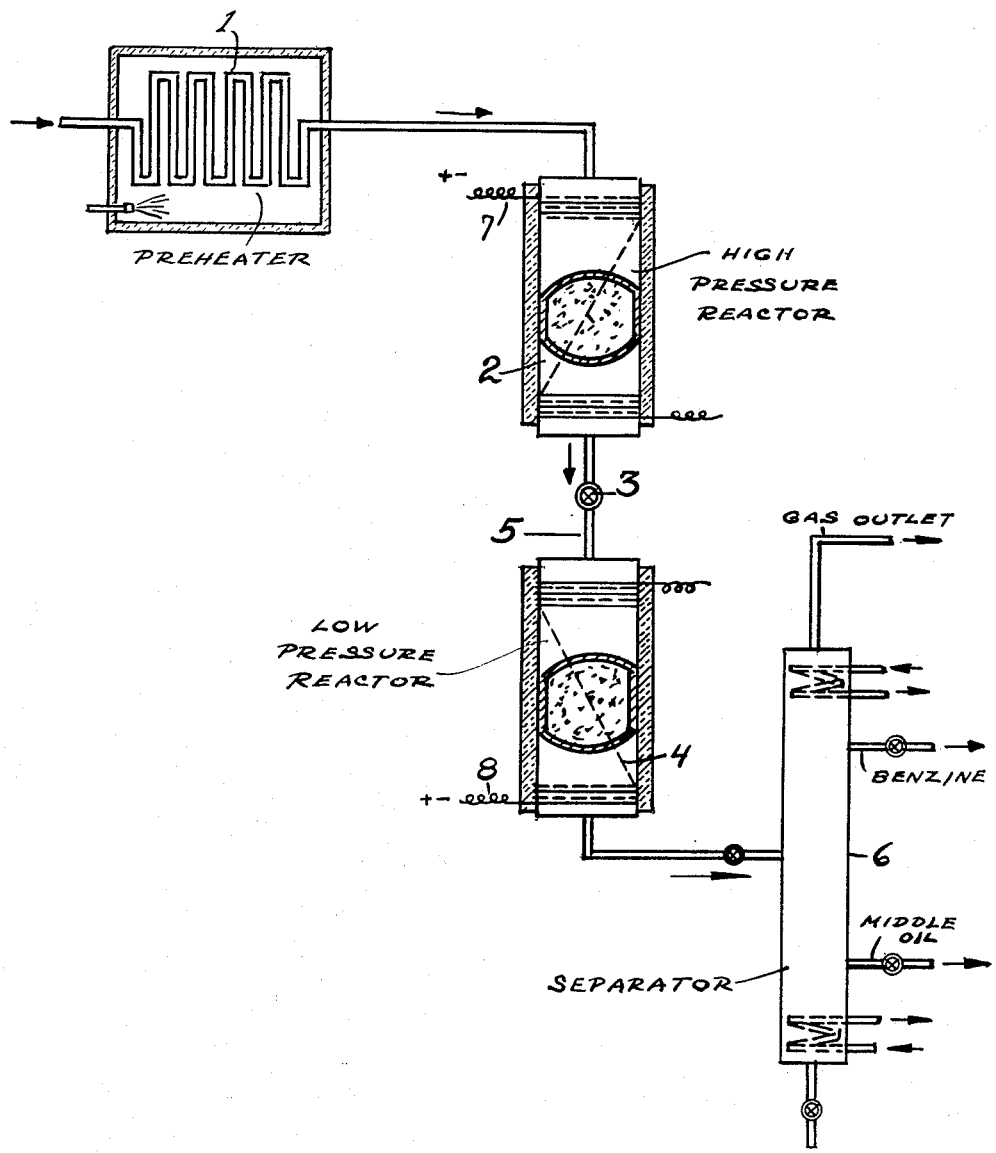

PROCESS FOR THE PRODUCTION OF NON-KNOCKING MOTOR FUELS

Mathias Pier, Heidelberg, and Gerhard Free, Ludwigshafen-on-the-Rhine, Germany; vested in the Alien Property Custodian Application July 26, 1939, Serial No. 286,564
In Germany July 27, 1938

3 Claims. (Cl. 196—49)

The present invention relates to the catalytic cracking of hydrocarbons.

We have found that in the cracking of hydrocarbon oils by leading their vapors over rigidly-arranged catalysts the yield of low-boiling substances, in particular non-knocking fuels, can be increased and the nature of the products can be improved if the starting materials are passed through more than one reaction zone whereby the pressure between at least two reaction zones is reduced by at least 5 atmospheres, for example by means of regulating valves, without reducing substantially the temperature.

As initial materials there may be mentioned in particular hydrocarbons rich in hydrogen and capable of being vaporized under the reaction conditions from petroleums, destructive hydrogenation products and the like, for example heavy benzines or middle oils. The hydrocarbon mixtures obtained by the reduction of carbon monoxide are especially suitable. Hydrocarbons rich in hydrogen may also be worked up in admixture with hydrocarbons poorer in hydrogen, in particular aromatic hydrocarbons.

From the initial materials rich in hydrogen there are thus obtained in good yields benzines which are non-knocking and contain relatively small amounts of unsaturated hydrocarbons because during the treatment there takes place an isomerization of the hydrocarbons which causes a high octane number and high sensitiveness to lead.

For example the process is carried out in the first reaction zone at a pressure of 5 to 150 atmospheres or more, and then, without separation of the benzine formed, in the second zone at a lower pressure, preferably at a pressure lower by 5 to 100 atmospheres or more than that first used. Temperatures of from 350° to 700°, preferably from 400° to 600° centigrade are used and the temperatures in the single pressure stages may be approximately the same. For example the process may also be carried out at increasing temperatures; the increase may amount to from 10° to 100°, preferably from 15° to 50° centigrade.

As catalysts which are preferably rigidly arranged in the reaction chamber there may be mentioned substances promoting the cracking, as for example natural or synthetic aluminum silicates, which if desired may be pretreated with acids, as for example hydrofluoric acid, or alumina or active carbon. These substances may also be used together with the oxides of chromium, molybdenum, tungsten, manganese, magnesium or zinc, as for example oxides of aluminum and chromium or mixtures of the said oxides. The said metal oxides may also be used alone.

It may be advantageous to work in the single pressure stages in the presence of different catalysts, a less strongly cracking catalyst being used at the higher pressure and a more strongly cracking catalyst being used at the lower pressure. Thus for example at lower pressure there may be used synthetically prepared aluminum silicates or bleaching earths which have been pretreated with acid, in particular hydrofluoric acid, and at higher pressure there may be used for example catalysts which have been used for a long time. Also at least one reaction zone, preferably the one standing under the higher pressure, may be kept free from catalysts and be empty or, if desired, provided only with adsorbing agents.

The catalysts are usually used for only a short time, as for example from 20 minutes to 2 hours, and then regenerated, for example with gases containing oxygen, preferably those having gradually increasing oxygen content, at increasing temperature and then used again, if desired, in admixture with fresh catalyst.

The following examples when taken with the accompanying drawing showing diagrammatically and partially in section a suitable apparatus for the invention will further illustrate the nature of this invention but the invention is not restricted to these examples.

*Example 1*

Two reaction chambers 2 and 4 connected one behind the other by line 5 and arranged one above the other are filled with catalysts in the form of pieces, the catalyst of the first chamber consisting of bleaching earth and that of the second chamber consisting of aluminum silicate prepared according to the specification of Serial No. 222,144, filed July 30, 1938. The reaction chambers are electrically heated to 460° C. by heat elements 7 and 8. A regulating valve 3 is provided in the connecting line 5. A middle oil from German petroleum is led through a preheater 1 and then into the upper part of the first chamber 2, the regulating valve being closed. By reason of the vaporization of the oil, an increased pressure is set up in the first chamber 2. The regulating valve 3 is then opened in such a manner that a pressure of 20 atmospheres is maintained in the first chamber 2. The product released from pressure passes then into the second chamber 4 at the same temperature and over the aluminum silicate catalyst and thence into separator 6 wherein it is separated into a middle oil fraction, a benzine fraction and gaseous hydrocarbons. The throughput amounts to 0.5 liter of oil per liter of catalyst per hour.

By working in this way there are obtained 35 per cent of benzine having an iodine value of 40 and an octane number of 72 (motor method). It is very sensitive to lead and has for example an octane number of 85 after the addition of 0.09 per cent of lead tetra-ethyl. The benzine also has a good stability in storage.

*Example 2*

An asphalt base petroleum distillate with an initial boiling point of 250° C. of which 40 per cent boils up to 350° C. is passed at 480° C. through a reaction chamber which is filled with lumps of burnt clay; this chamber may be closed by a valve and a pressure of 10 atmospheres is produced in it by the vaporization of the oil which pressure is constantly maintained by the valve. The oil vapors are continuously released to atmospheric pressure into a second reaction chamber which is filled with aluminum silicate synthetically produced, whereby the throughput is 1 liter of oil per 1 liter of catalyst. A reaction product is obtained with 28 per cent of benzine.

What we claim is:

1. A process for the production of a non-knocking motor fuel which comprises passing all of a hydrocarbon fluid mainly boiling above 250° C. at a cracking temperature through two reaction zones in succession, maintaining a superatmospheric pressure of about 10 atmospheres in said first reaction zone, thereby cracking the said fluid substantially by the action of temperature and pressure, reducing the pressure on the hydrocarbon fluid by at least about 5 atmospheres before passing it to said second reaction zone without substantially reducing the temperature, said last mentioned reaction zone containing a cracking catalyst, thereby further cracking said fluid substantially by the action of temperature and catalyst.

2. A process for the production of a non-knocking motor fuel which comprises passing all of a hydrocarbon fluid mainly boiling above 250° C. at a cracking temperature through two reaction zones in succession, maintaining a superatmospheric pressure of about 10 atmospheres in said first reaction zone which zone is provided with an absorbing agent, thereby cracking the said fluid substantially by the action of temperature and pressure, reducing the pressure on the hydrocarbon fluid to about atmospheric pressure before passing it to said second reaction zone without substantially reducing the temperature, said last mentioned reaction zone containing a catalytically acting silicate, thereby further cracking said fluid substantially by the action of temperature and catalyst.

3. A process for the production of a non-knocking motor fuel which comprises passing all of a hydrocarbon fluid mainly boiling above 250° C. at a cracking temperature through two reaction zones in succession both of which are provided with cracking catalysts, maintaining a superatmospheric pressure of about 10 atmospheres in the first reaction zone, reducing the pressure on the hydrocarbon fluid by at least about 5 atmospheres before passing it to the second reaction zone without substantially reducing the temperature, the first reaction zone containing a less strongly acting cracking catalyst and the second reaction zone containing a more strongly acting cracking catalyst, thereby cracking the said fluid in said first reaction zone substantially by the action of temperature and pressure and in said second reaction zone substantially by the action of temperature and catalyst.

MATHIAS PIER.
GERHARD FREE.